Sept. 29, 1970 D. M. WILLYOUNG 3,531,653
MULTIPHASE GENERATOR AND BUS SYSTEM
Filed April 29, 1969 5 Sheets-Sheet 1
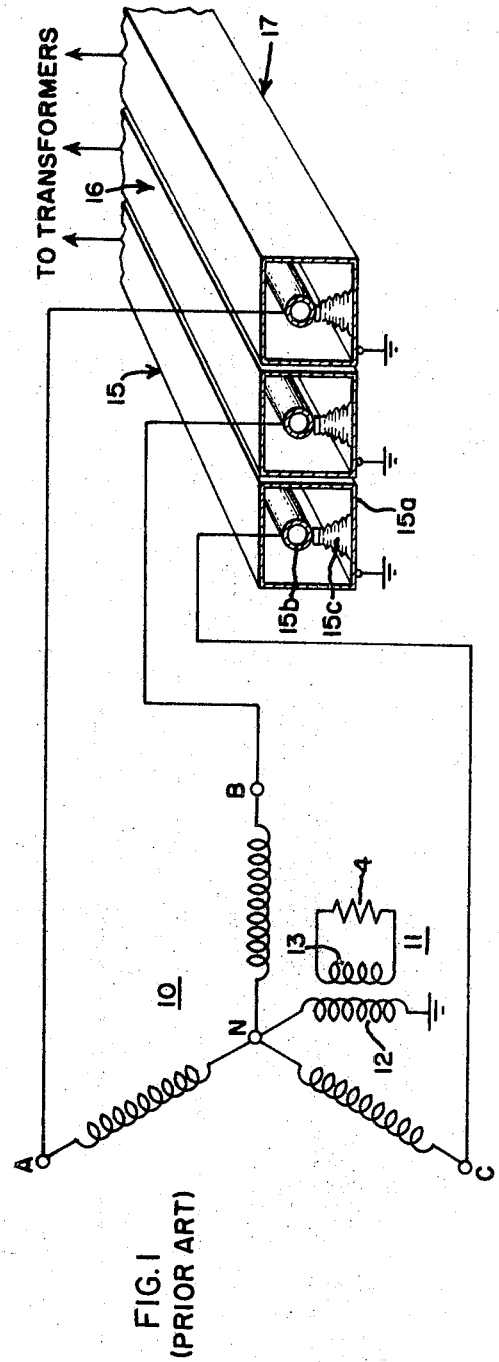
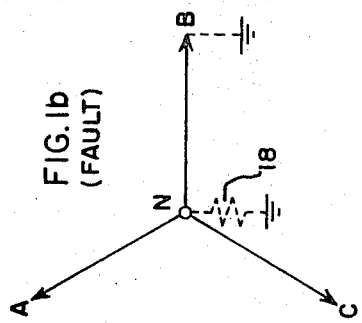
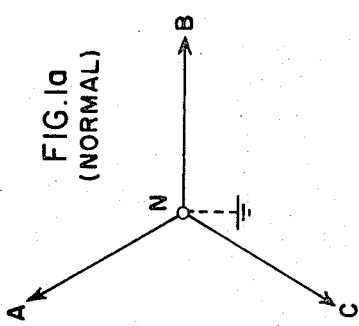
INVENTOR:
DAVID M. WILLYOUNG,
BY *W. C. Crutcher*
HIS ATTORNEY.

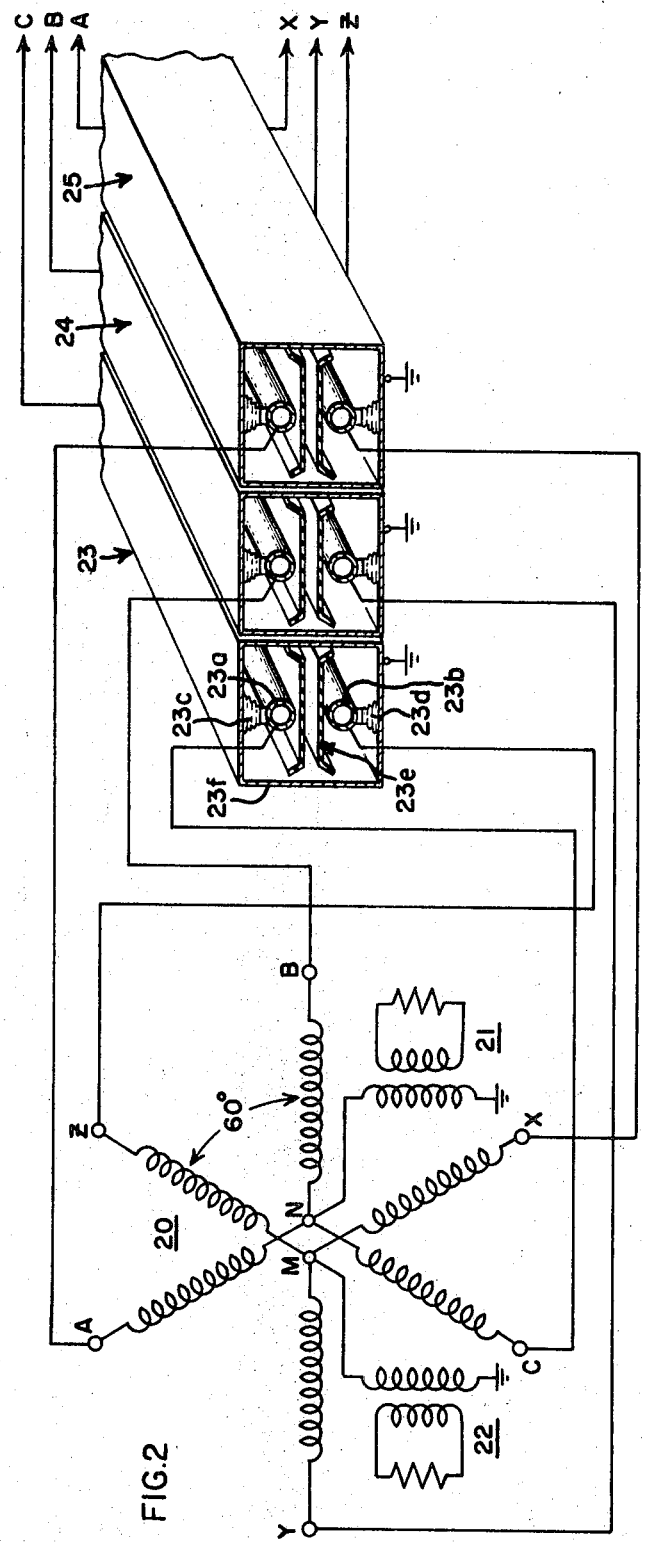
FIG.2
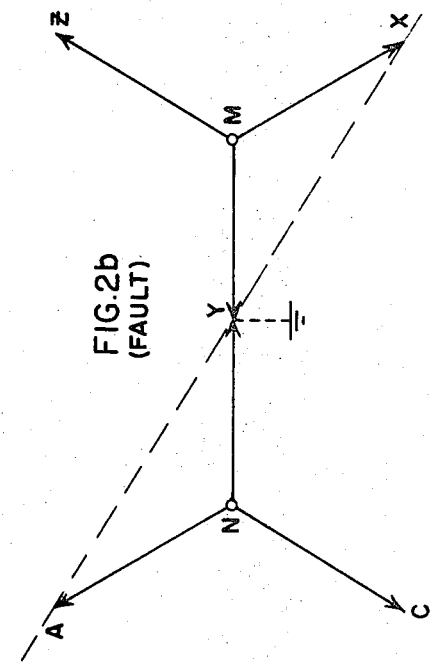
FIG.2b (FAULT)
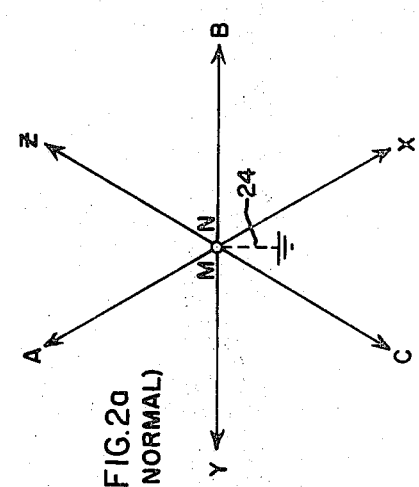
FIG.2a (NORMAL)
INVENTOR:
DAVID M. WILLYOUNG,
BY
HIS ATTORNEY.

Sept. 29, 1970   D. M. WILLYOUNG   3,531,653
MULTIPHASE GENERATOR AND BUS SYSTEM
Filed April 29, 1969   5 Sheets-Sheet 4

INVENTOR:
DAVID M. WILLYOUNG,
BY W.C. Crutcher
HIS ATTORNEY.

United States Patent Office 3,531,653
Patented Sept. 29, 1970

3,531,653
MULTIPHASE GENERATOR AND BUS SYSTEM
David M. Willyoung, Scotia, N.Y., assignor to General Electric Company, a corporation of New York
Filed Apr. 29, 1969, Ser. No. 820,243
Int. Cl. H01b *11/02*
U.S. Cl. 307—147                               7 Claims

ABSTRACT OF THE DISCLOSURE

A polyphase generator has more than one set of three phase windings each having its own neutral point separately connected to ground through a current responsive impedance. Leads from different phase sets which are in substantial phase opposition may be led through isolated bus sections without danger of excessive currents in the event of a fault and recombined into three phase power by transformers. Although particularly illustrated for a six phase generator with paired conductors in isolated bus sections, the invention applies to other polyphase generation and bus systems.

BACKGROUND OF THE INVENTION

Briefly stated, this invention relates to polyphase generator-bus-transformer systems. More particularly, the invention relates to generation systems for three phase power which greatly reduce the hazard of destructive forces in the event of line-to-line or line-to-ground faults within the system.

Present-day turbine-generators are constantly being improved to increase the ratings. As ratings go higher, up to the range of 2000 mva. for three-phase, three-bus systems, the line currents become excessively high if one is not to exceed the present voltage levels. For example, the line current for a 1350 mva. generator at 26 kv. is 30,000 amperes. The line current for a 2500 mva. generator at 24 kv. is 60,000 amperes.

Under present-day three-phase unit generation systems, three phase generator power is delivered through three individual line conductors, supported within three isolated phase bus sections having grounded metal sheaths, to transformers where the voltage is stepped up for transmission. By Lenz's law of electromagnetic induction, the currents in the line conductors are mirrored in large part in each respective enclosing sheath, resulting in additional losses which add to the ohmic losses in the line conductors themselves.

Another problem with the aforedescribed arrangement when the currents become very large is that the stray magnetic fields around the isolated phase bus sections become sufficiently large to cause troublesome heating in adjacent structural parts, as well as false relaying signals in some cases. Even with present improvements in isolated phase bus designs which largely eliminates tray fields outside the sheath over most of the length, these problems may still occur near the ends of the sheath structures.

Accordingly, one object of the present invention is to provide an improved multiphase generator and bus system which permits phase currents to be reduced by using more phases without increased risk of destructive forces and heating for a fault between lines or from one line to ground.

Another object of the invention is to provide a multiphase generation system with a compact bus system which will limit fault currents to very low values and reduce losses and stray magnetic fields in the bus system generally.

DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description, taken in connection with the accompanying drawings in which:

FIG. 1 is a simplified representation of a prior art three-phase generator and isolated phase bus system, FIGS. 1a and 1b are vector diagrams corresponding to FIG. 1 for normal and fault conditions.

Figure 3:
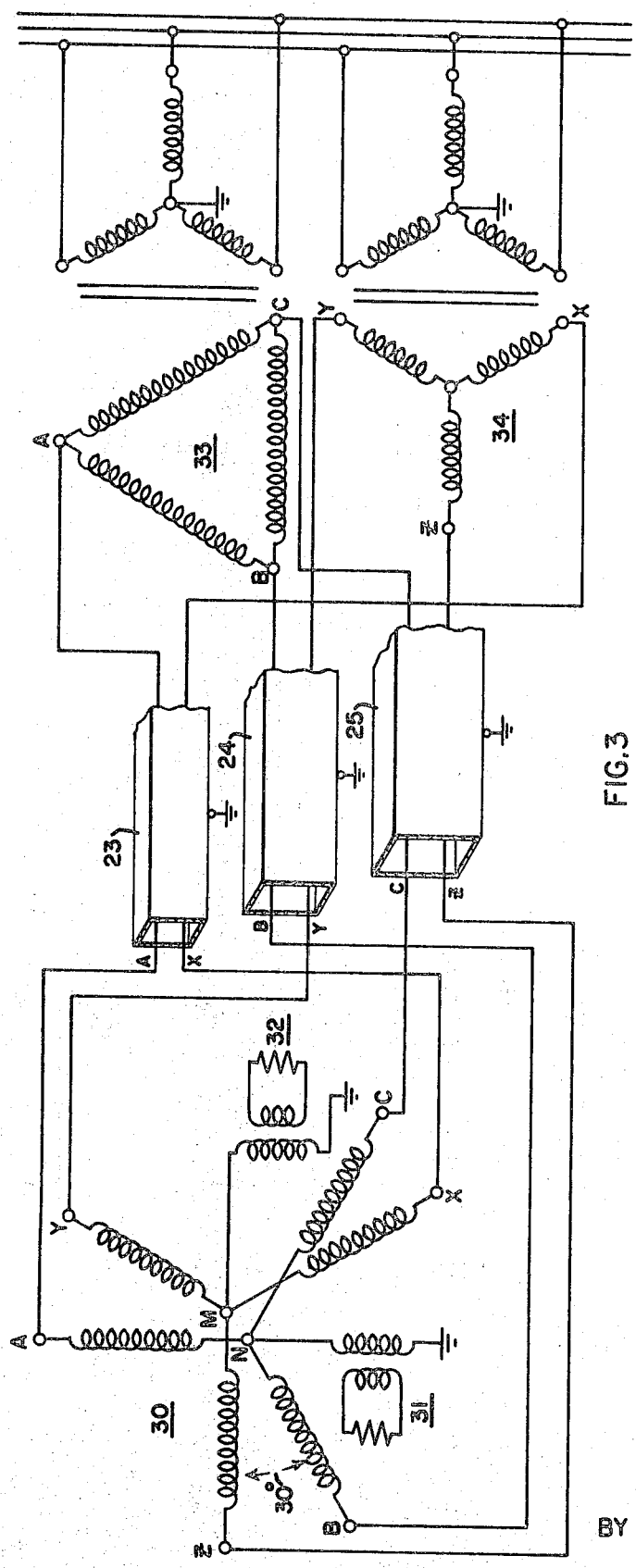
Figure 4:
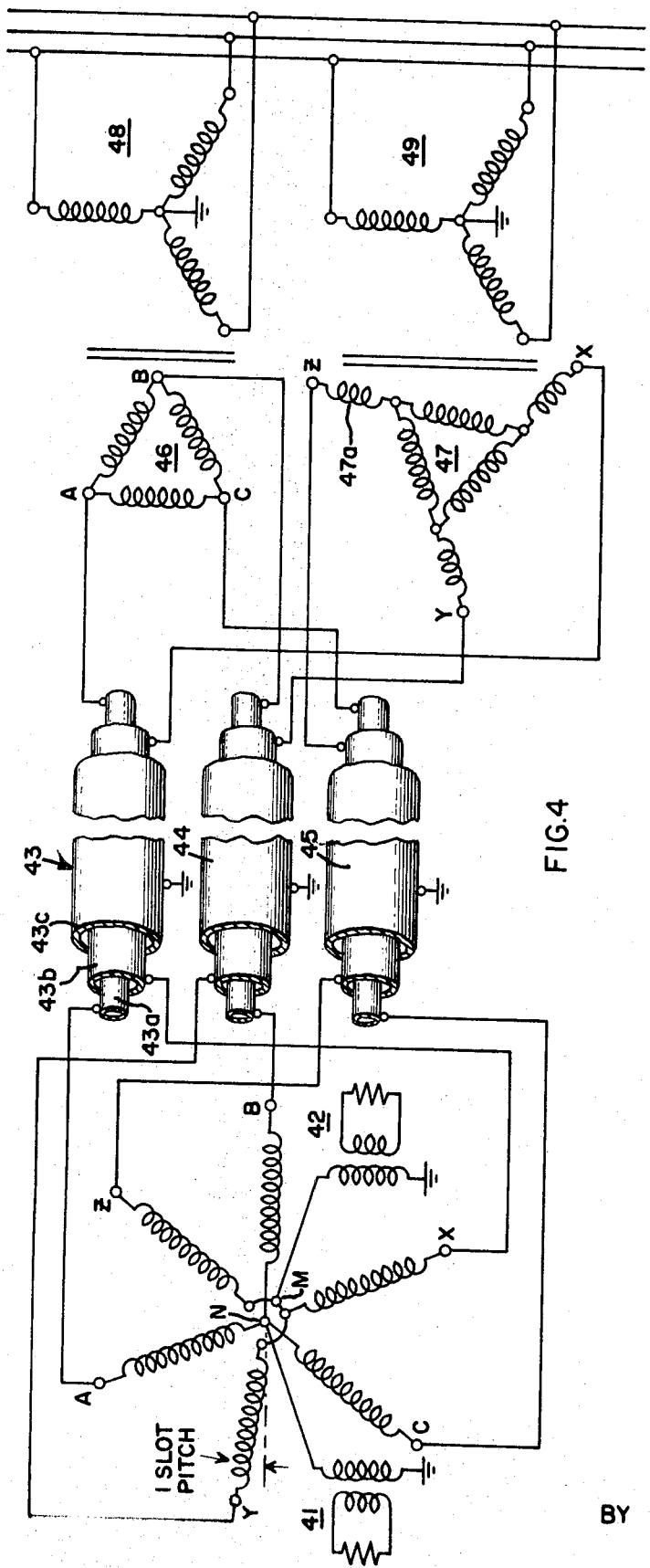
Figure 5:
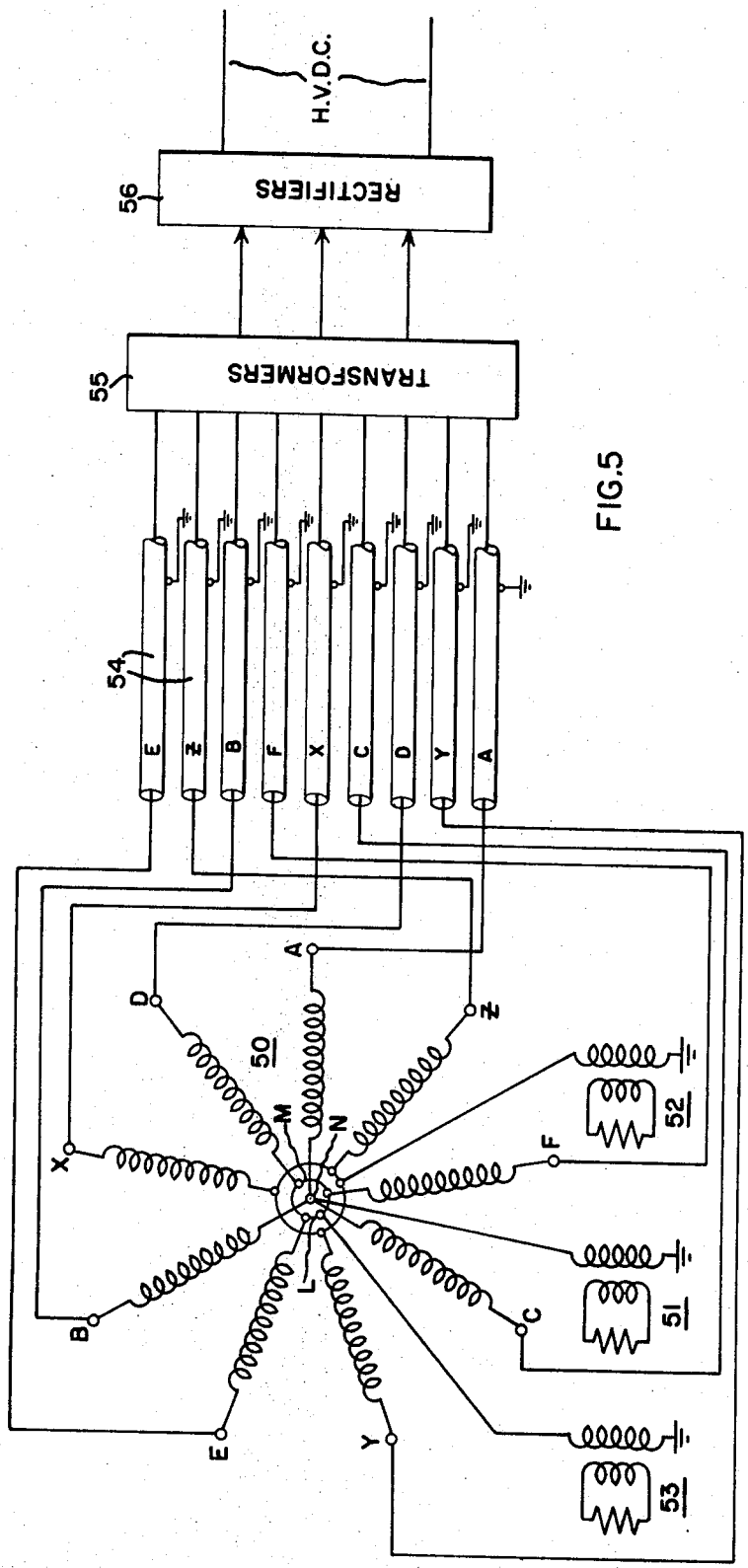

FIG. 2 is a simplified representation of a six-phase, six bus generator and bus system according to the present invention, FIGS. 2a and 2b are vector diagrams corresponding to normal and fault conditions for FIG. 2, FIG. 3 is a modified form of six phase, six bus system including a transformer arrangement to recombine into three phase power, FIG. 4 is yet another modified form of the invention illustrating other types of generator winding arrangements, bus arrangemntes, and recombining transformer arrangements, and FIG. 5 is a modified form of the invention illustrating a 9-phase generator and bus-transformer-rectifier system.

SUMMARY OF THE INVENTION

Briefly stated, the invention is practiced by providing a plurality of multiphase winding sets in the generator, each phase set having its own separate neutral connection. Each neutral connection is grounded through a separate current responsive impedance. In one type of bus arrangement, conductors from different phase sets which are substantially in phase opposition to one another may be disposed in a common sheath, thereby both reducing bus losses and limting fault currents.

DESCRIPTION OF THE PRIOR ART

Represented schematically in FIG. 1 is a three-phase generator, shown generally as 10, having windings disposed in the slots and connected so as to provide phase winding A, phase winding B, and phase winding C. As will be understood to those skilled in the art, each of the phase windings may include one or more phase belts and one or more parallel-connected circuits arranged to prevent unbalance between circuits. Examples of such winding arrangements are shown in U.S. Pats. 2,778,962 to H. D. Taylor, 2,778,963 to R. Habermann, Jr., 3,152,273 to D. B. Harrington, 3,201,627 to D. B. Harrington, and 3,408,517 to D. M. Willyoung, all of the foregoing being assigned to the present assignee and intended for providing three-phase power to the isolated phase bus system.

The neutral point N of the star-connected phase windings for phases A, B and C is connected to ground via a current responsive impedance 11 comprising a single phase transformer having a primary coil 12 and a secondary coil 13 with a load resistor 14 connected across coil 13. For a line-to-ground fault, currents are limited by the neutral grounding impedance 11 to values on the order of 10 amperes.

The three-phase leads A, B and C are connected respectively to isolated phase bus sections 15, 16, 17. Using section 15 as an example, each includes a grounded metal sheath 15a, enclosing a bus conductor 15b supported by a standoff insulator 15c. Such bus sections may be of various shapes and are designed and constructed to minimize undesirable effects of the fields from the electrical conductors inside, as well as to contain forces due to eddy currents and possible short circuits. Examples of suitable bus constructions are shown in more detail in U.S. Pats. 2,647,940 to N. Swerdlow et al., and 3,015,743 to W. F. Skeats.

FIG. 1a represents the voltage vectors for the three phases and indicates a virtual ground between the neutral point and ground through the transformer primary 12 and associated capacitive coupling. FIG. 1b illustrates the operation of this prior art device in the event of a fault. If point B inadvertently is grounded, point N will be raised roughly to phase voltage above ground due to the blocking effect of the current responsive impedance (indicated by the virtual impedance 18 to ground). Points A and C will be raised roughly to $\sqrt{3}$ times phase voltage above ground.

DESCRIPTION OF FIG. 2

Referring to FIG. 2 of the drawing, a generator 20 is shown as comprising two completely separate sets of three phase windings. Phase set ABC has a neutral connection, indicated by N, while phase set XYZ has a different neutral connection M. The windings in the generator in this embodiment are arranged so that the two phase sets ABC and XYZ are 60 degrees apart with respect to the generated phase voltages in each of the windings. Various winding patterns may be used to accomplish this internally within the generator, either by rearranging connections between previously known "multiple circuit" windings, for example, using some of the winding patterns in the previously cited patents.

Also many prior art winding arrangements for providing two completely separate windings on one generator stator core have been described in the art such as U.S. Pat. 1,815,823 to T. F. Barton; Reissue Pat. 19,433 to D. D. Chase; U.S. Pat. 2,630,540 to J. E. McElligott et al. There is little distinction between separate windings on one core and multicircuit windings having more than one parallel connected circuit per phase, since either of these can usually be connected to produce two or more phase sets displaced in phase from one another.

In practice, therefore, the FIG. 2 winding arrangement can be accomplished very easily by rearranging the internal connections of previously known two-circuit windings simply by the means of reversing the neutral connections for one circuit of each phase.

In accordance with the invention, neutral point N of phase set ABC is grounded through a current responsive impedance 21, while neutral point M of phase XYZ is separately grounded through another current responsive impedance 22. These can be identical to impedance 11 described in connection with FIG. 1. Paired leads from the separate phase sets are conducted to separate bus sections 23, 24, 25. Each section, such as 23, includes two bus conductors 23a, 23b supported by opposed standoff insulators 23c, 23d. A dielectric shield 23e composed of two spaced insulating sheets with an air gap separates the two conductors. In some cases there may be an additional thin metal or screen shield between conductors. The two conductors are enclosed in a common sheath 23f. It is important to note that the two conductors in each sheath have independent neutral points M and N and preferably are selected to be in substantial phase opposition, i.e., in sheath 23f are phases C and Z which are substantially 180° apart. Similarly, leads from phase windings Y and B are paired in bus section 24 and leads from phases A and X are paired in bus section 25.

OPERATION OF FIG. 2 (FIGS. 2a AND 2b)

FIG. 2a illustrates the vector diagram for the six-phase generation provided by the two separate three-phase sets of FIG. 2. Under balanced conditions, both neutrals M and N are at the same potential as indicated by the single virtual ground 24.

As noted previously, for the most advantageous arrangement, two conductors in substantial phase opposition are disposed in the same bus sheath. In the event of a line-to-line fault within the sheath, which is the worst condition, the voltage vectors would appear as indicated in FIG. 2b. Here, it is assumed that the two phase voltages B and Y in bus section 24 have undergone a line-to-line fault. Because of the fact that the neutral to ground currents are limited by current responsive impedances 21, 22, the neutral points M, N are driven apart in phase opposition by equal amounts and since the B and Y voltages are opposed, practically no fault current flows, either between lines or to ground. Although the respective dielectric stresses between unfaulted phases A and X in bus section 25 and between C and Z in section 23 are increased, they do not exceed $\sqrt{3}$ times their previous values, this being shown by the dashed line in FIG. 2b.

The primary advantage of using substantially phase opposed line conductors within the same sheath is so that their fields will largely cancel, thereby minimizing normal sheath losses and external fields. Therefore, substantial savings can be made in bus construction and through reduced total loss.

Furthermore, by connecting the neutral points through separate current responsive impedance to ground, it becomes possible to enclose paired conductors in the same bus sheath without danger of large destructive currents in the event of a fault between any of the conductors in a common sheath.

MODIFICATION (FIG. 3)

FIG. 3 shows a modified form of the invention, wherein a generator is wound to provide two 3-phase sets displaced 30° apart from one another in time phase relationship. The generator winding may be accomplished as described in U.S. Pat. 2,731,576 issued to J. E. McElligott on Jan. 17, 1956, which is incorporated herein by reference. However, instead of using a common neutral-to-ground connection as shown in the McElligott patent, the neutral point N for phase A, B, C is grounded through a current responsive impedance 31 and the neutral point M of phase set XYZ is grounded through impedance 32. The leads are conducted in pairs by means of bus sections 23, 24, 25 which may be constructed as described in connection with FIG. 2.

In order to recombine the two three-phase sets with 30° offset, a special transformer arrangement can be used to provide a 30° phase shift in one of the three-phase sets. This is shown as a delta-connected primary 33 for phase A, B, C and a star-connected primary 34 for phase set XYZ. The operation of the arrangement would be similar to that described in connection with FIG. 2, with the exception that the respective pairs of conductors are not in 180° phase operation but are in 150° phase opposition. Hence, cancellation of electromagnetic fields from the two conductors is not as complete as it could be if the conductor currents were in 180° phase opposition. Nonetheless substantial cancellation is achieved so that induced currents and losses in the sheath enclosure are much lower than if independent sheaths of approximately the same dimensions were used for each of the six line conductors. In the event of a line-line fault between conductors within a sheath, or a single line to sheath fault, fault currents will be limited to a low, nondestructive value by the current responsive grounding impedances 31, 32 just as in the previously described embodiments. Similar to prior art, relaying can be used to detect the rise in voltage of the neutral point so that circuit breakers can be opened and the generator can be deenergized allowing the fault to be cleared.

MODIFICATION (FIG. 4)

In some cases, it may be desirable to wind a generator such that there are two completely separate three-phase winding sets which are physically displaced by one slot pitch. For example, such a winding appears in U.S. Reissue Pat. 19,433 to D. D. Chase. Such a generator is indicated at 40 with the slot pitch angle greatly exaggerated. However, the phase windings are connected so as to provide two three-phase sets displaced in time from one another by 180° plus one slot pitch. Neutrals M and N are separately grounded through impedances 41, 42 as before. Leads from windings in substantial phase opposition are brought out in pairs as before through bus sections 43, 44, 45. These are shown in a coaxial tubular configuration, although they could be arranged also as previously described in FIG. 2. Each of these bus sections is arranged to include an inner conductor such as 43a, a spaced coaxial outer conductor 43b, and a spaced coaxial grounded sheath 43c. These are separated from one another by suitable standoff insulators, not shown. It is also possible to circulate transformer oil back and forth between the tubular sections to provide dielectric insulation.

The two three-phase sets are converted and combined into a single three-phase set using a phase shifting transformer of any of the commonly known types. In FIG. 4 two delta-connected transformer primaries 46, 47 are shown in combination with star-connected secondaries 48, 49. The transformer primary 47 is "over-wound" as indicated at 47a to compensate for the one slot pitch phase offset in the generator winding.

MODIFICATION (FIG. 5)

FIG. 5 illustrates that the invention is not confined to six-phase systems nor to bus systems using those opposed conductor pairs only, nor even to recombination into three-phase power. A generator 50 is provided with three separate three-phase windings connected in three separate phase sets ABC, XYZ, DEF. These have separate neutral connections N, M and L respectively grounded through current responsive impedances 51, 52, 53. A lead from each of the phase windings is conducted through a separate conventional isolated phase bus section 54. The arrangement of the generator winding itself may be as illustrated in U.S. Pat. 2,714,700 issued to W. M. Johnson and describing a 9-phase generation system. The 9 phases may be recombined into 3-phase power as shown in that patent or, as schematically indicated in FIG. 5, may be recombined in the transformer bank 55 and converted by rectifiers 56 to high voltage DC power.

Although the bus sections in FIG. 5 do not carry paired conductors to achieve the aforementioned benefits of field cancellation, the expected losses therein are much smaller due to the fact that much lower currents are carried for a 9-phase system than in a 3-phase system of the same rating. The bus sections are physically arranged so that no bus section is adjacent to a bus section in the same phase set, but is adjacent a conductor in substantial phase opposition. For example, the arrangement shown is A, Y, D, C, X, F, B, Z, E. With this arrangement, fault currents would be limited through operation of the separate grounding systems for each of the three phase sets.

SUMMARY

Thus the use of multiple phase sets or separate windings within the generator which are provided with separate neutral connections grounded through separate current responsive impedances, introduces simplifications and savings in the bus system associated with the generator.

First, by merely using a greater number of phases than previously, the line currents are reduced (for the same voltage) and hence bus construction is simplified and bus sheathing losses are reduced.

Secondly, by splitting the winding into separate phase sets with separate neutrals, conductors from separate phase sets in substantial phase opposition can be run in a common sheath to further minimize sheath losses and external fields.

Thirdly, in the event of a fault of one or more of the phase-opposed conductors, the current responsive impedances serve to drive the neutral points apart in potential and limit fault currents. The dielectric stress between unfaulted conductors is increased, but not by an unreasonable amount.

Although the arrangement is particularly adaptable to six phase generators coupled with paired conductors in three isolated bus sheath sections, this is primarily because of similarity to present systems. The invention is applicable, however, to any polyphase system where the generator windings can provide more than one polyphase set, each with its own neutral. For example, although not illustrated in the figures, the applicability to two two-phase sets should be readily apparent. Here, there would be four phase windings 90 degrees apart in the generators. There would be two bus sections, each having two conductors 180 degrees in phase opposition disposed therein.

While there is shown what is considered at present to be the preferred embodiment of the invention, it is of course understood that various other modifications may be made therein, and it is intended to cover in the appended claims all such modifications as fall within the true spirit and scope of the invention.

What I claim as new and desire to secure by Letters Patent of the United States is:

1. A polyphase power generation system comprising:
   a generator having a plurality of polyphase winding sets, each set having a separate neutral connection,
   a plurality of current responsive impedances, each of said impedances being separately connected between one of said neutral connections and ground, and
   a plurality of bus sections having conductors connected to said winding sets, and having grounded sheaths, whereby fault currents between sets will be limited by said impedances to low values.

2. The combination according to claim 1, wherein conductors from different phase sets which are also in substantial phase opposition are disposed adjacent one another, whereby fault currents therebetween will be limited.

3. The combination according to claim 1, wherein each of said bus sections comprises a common sheath enclosing one conductor from each of said phase sets, the enclosed conductors being selected to be in substantial phase opposition to one another.

4. The combination according to claim 3, wherein there are two of said polyphase winding sets, and wherein each bus section comprises two conductors disposed in said common sheath on opposed standoff insulators.

5. The combination according to claim 3, wherein there are two of said polyphase winding sets, and wherein each bus section comprises a common tubular sheath having two conductors from said two phase sets disposed coaxially therein with respect to one another and with respect to said sheath.

6. The combination according to claim 1, wherein each of said plurality of polyphase winding sets is three phase, and further including transformer means connected to said bus sections and arranged to combine said plurality of three phase sets into one three-phase line power source.

7. A polyphase power generation system comprising:
   a generator having two sets of three-phase windings, each set having a separate neutral connection and arranged so that the individual phase windings are in substantial phase opposition with respect to individual phase windings of the other set,
   a pair of current responsive impedances, each of said impedances being separately connected between one of said neutral connections and ground,
   three isolated bus sections, each having a pair of conductors disposed in a common sheath, said conductors being connected to individual phase windings from respective sets which are in substantial phase opposition, whereby fault currents therebetween will be limited to low values and whereby the conductor fields will tend to cancel one another to limit sheath losses, and transformer means recombining said two phase sets into a single three-phase line power source.

References Cited

UNITED STATES PATENTS

| | | |
|---|---|---|
| 1,387,469 | 11/1921 | Chubb. |
| 2,306,226 | 6/1942 | Schrage. |
| 3,259,802 | 7/1966 | Steen. |

ROBERT K. SCHAEFER, Primary Examiner

H. J. HOHAUSER, Assistant Examiner

U.S. Cl. X.R.

317—18